United States Patent [19]
Gottlich et al.

[11] Patent Number: 6,024,288
[45] Date of Patent: Feb. 15, 2000

[54] PROMOTION SYSTEM INCLUDING AN IC-CARD MEMORY FOR OBTAINING AND TRACKING A PLURALITY OF TRANSACTIONS

[75] Inventors: Stephen Gottlich, Overland Park, Kans.; Jacob B. Horwitz, Palmdale, Calif.

[73] Assignee: Graphic Technology, Inc., New Century, Kans.

[21] Appl. No.: 08/997,922

[22] Filed: Dec. 24, 1997

Related U.S. Application Data

[63] Continuation of application No. 08/774,961, Dec. 27, 1996, Pat. No. 5,932,869.

[51] Int. Cl.[7] .................................................. G06K 19/06
[52] U.S. Cl. ........................ 235/493; 235/380; 235/449; 235/475; 902/27
[58] Field of Search ................................. 235/493, 487, 235/488, 492, 494, 375, 380, 435, 439, 440, 475; 902/27

[56] References Cited

U.S. PATENT DOCUMENTS

| | | | |
|---|---|---|---|
| 4,650,975 | 3/1987 | Kitchener | 235/375 |
| 4,803,351 | 2/1989 | Shigenaga | 235/492 |
| 4,855,578 | 8/1989 | Hirokawa et al. | 235/380 |
| 5,055,660 | 10/1991 | Bertagna et al. | 235/472.01 |
| 5,268,963 | 12/1993 | Monroe et al. | 380/23 |

*Primary Examiner*—Michael G Lee
*Attorney, Agent, or Firm*—Spencer Fane Britt & Browne LLP

[57] ABSTRACT

An apparatus is provided for tracking individual user consumer transactions which provides the user with an eraseable, re-writeable, visual format display while avoiding retrieval of data from an outside source.

5 Claims, 5 Drawing Sheets

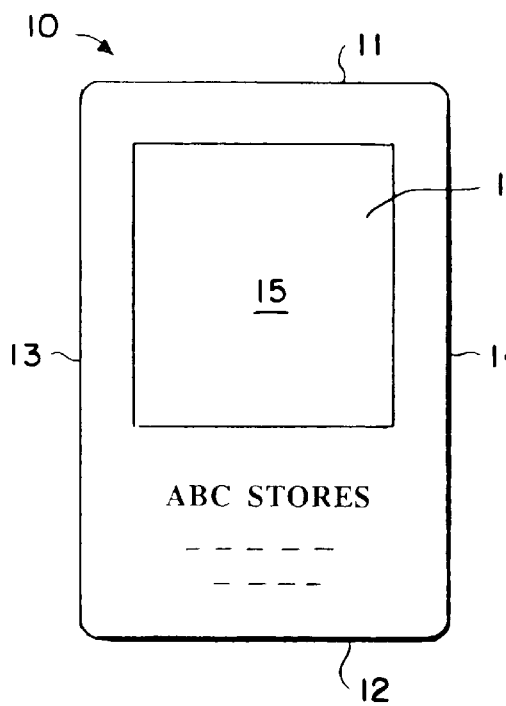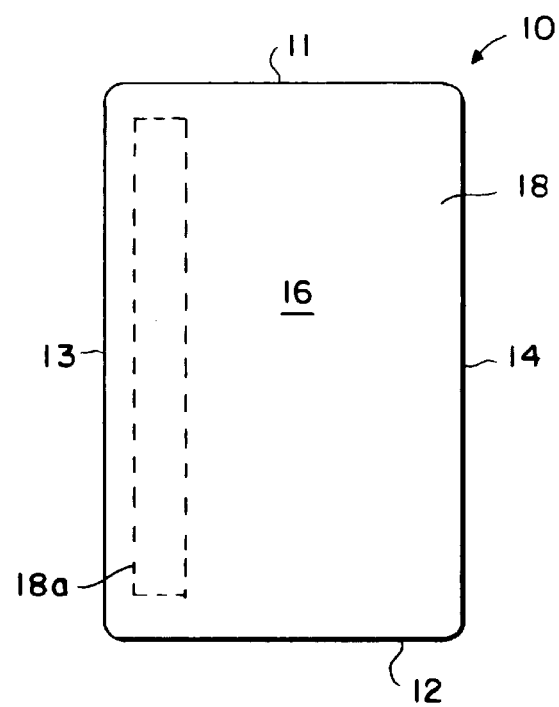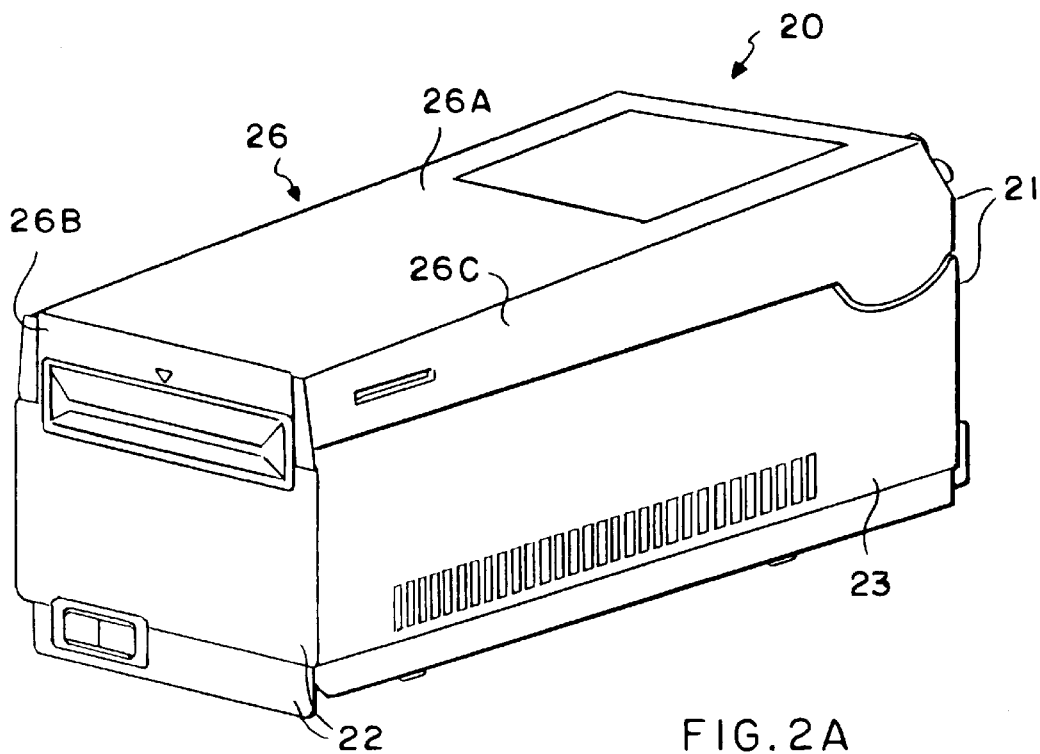

FIG. 3C
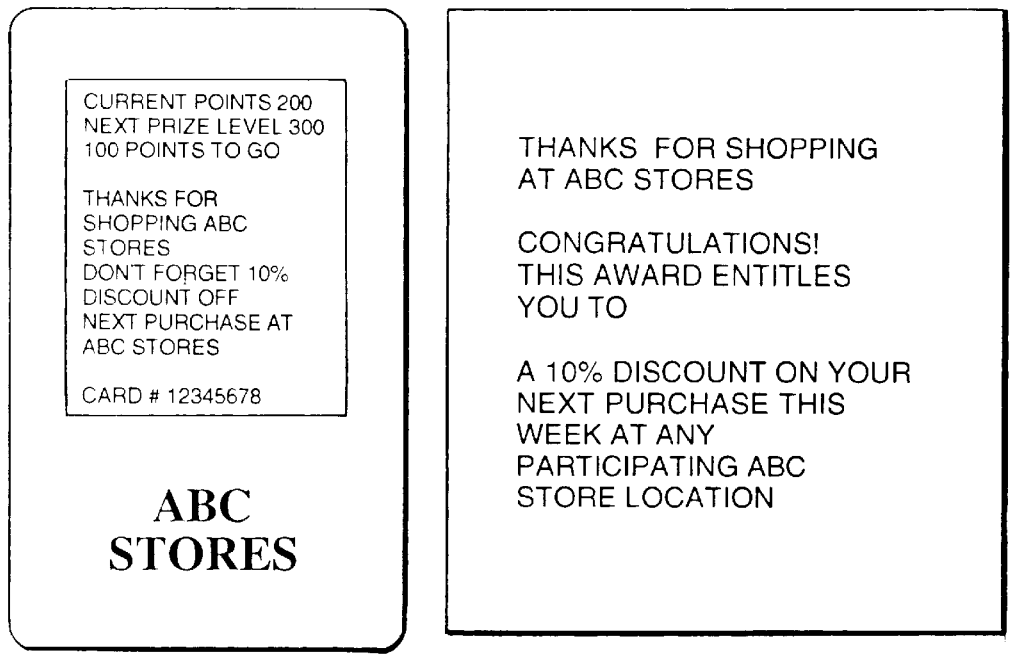
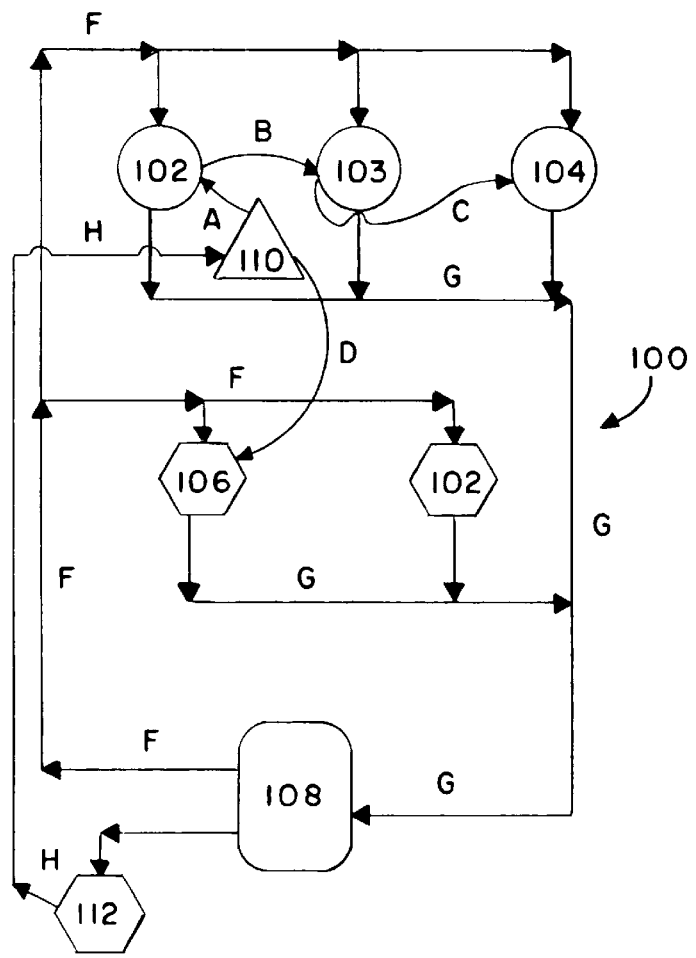
FIG. 4

PROMOTION SYSTEM INCLUDING AN IC-CARD MEMORY FOR OBTAINING AND TRACKING A PLURALITY OF TRANSACTIONS

This application is a continuation of application Ser. No. 08/774,961 filed Dec. 27, 1996, now U.S. Pat. No. 5,932,869.

BACKGROUND OF THE INVENTION

A. Field of the Invention

The present invention relates to an affordable, yet effective, system and apparatus for determining, upon request, an appropriate personalized and individually-targeted response for a particular user based upon current user-specific data with real-time delivery of that response to the user in non-volatile, re-writable visual format.

B. Description of the Prior Art

In today's competitive environment, businesses are in a constant battle to increase market share. As a result, each day we are exposed to an extensive variety of marketing techniques, including broadcast advertising on television and radio; print advertising in magazines and newspapers; various coupon delivery systems; direct mail; billboards; contests; and in-store displays. Although such advertising serves its purpose in providing widespread exposure of a product or service to the public, it has its limitations as well. For example, consumers that are constantly being bombarded from so many directions become immune to the message and may either tune it out unconsciously by disregarding it or literally by a flip of a switch, touch of the remote control, or toss into the trash can. In an environment of such saturation, it is difficult to communicate with a specific consumer in a meaningful manner so as to precipitate a desired response to the message. Further, even when these marketing techniques actually cause a consumer to choose a particular product or service, the overwhelming variety of options being thrown at the customer daily makes customer loyalty hard to attain. In addition to the glut of marketing messages, another factor responsible for the ineffectiveness of many of these marketing techniques lies in the treatment of consumers collectively rather than as individuals. It is much easier to ignore a message delivered to "anyone" and "everyone" than one delivered personally. Thus, what is needed is a marketing system that personalizes the message. As a result, the consumer's attention will be focused on that product or service and the ability to build customer loyalty will be greatly increased.

Couponing is one method that has received attention as a way of personalizing the marketing effort. For instance, coupons or other promotions may be targeted through the use of prepared mailing lists which selectively identify persons with demographic characteristics and consumption histories believed to make them more inclined to buy a particular product or service than the general public. These demographic characteristics and consumption histories are compiled through the use of huge databases and powerful computers. Although this technique may result in more meaningful and, it is hoped, more effective advertising, the problem here, once again, is that consumers are flooded with such mailings. It is easy for the consumer to disregard the mailing and toss it away. Moreover, even if the consumer acts on a coupon to visit a particular business one week, that consumer will undoubtedly have another coupon beckoning the consumer's attention somewhere else the next week.

Other forms of targeted couponing include placing coupons on or in a product for use on the consumer's next purchase of that or a related product or issuing a coupon at the checkout for a related item based on an item currently being purchased. For example, if the consumer purchases dog food, the register might kick out a coupon for dog shampoo. Because the coupon delivery in this case is directly linked to a consumer's current purchase of a given product or service, it may be assumed that such a consumer is more likely to act on that coupon. Although such a system recognizes the importance of a consumer's purchasing history in targeting and personalizing the marketing message, it has the disadvantage of basing the response, in the form of the coupon generated, on what the consumer is purchasing at that one visit. One purchase is not an effective indicator of a consumer's longterm needs or desires. Such a system has no ability to "learn" from the consumer's overall consumption history and thus present the consumer with promotions that are highly individualized to meet that consumer's needs and desires. Moreover, mere delivery of a somewhat-focused coupon response does little to personalize the message.

U.S. Pat. No. 5,459,306 to Stein et al., in acknowledging the advantages of a more personalized marketing approach, employs knowledge of a consumer's previous purchasing history to produce targeted promotions and product recommendations. These promotions and product picks are then delivered to the consumer at the store to assist them in making a product choice. According to the Stein et al. system, a new user is issued an identifying code and that user's personal information is gathered and entered into a database at the store. As the consumer makes product choices, the consumer's purchase or rental history is also stored on site at the location of the purchase or rental in data processing retrievable format. Promotional offers, new product information, and the like are then downloaded to the store from a central host location for use by the store in preparing personalized product picks. Also downloaded from the host is a set of rules for making determinations as to appropriate product suggestions for a user based on that user's personal information and purchasing history, current promotional offers, and the availability of specific products at that store. When the user enters his/her unique code into a data processing means at the store such as a kiosk, a POS system, or stand-alone CPU, the user code is correlated with the in-store maintained personal and purchasing information. Then, the rules are applied, and a decision is made as to what currently-available products would most likely be of interest to that user. Product picks or recommendations based on currently-available stock are then recommended in printed format such as in a paper coupon.

One important disadvantage of the Stein et al. system, however, is that it relies on storage of a user's personal and purchasing history on site at the store or other such location. In Stein, it is suggested that this information be stored in the POS system or in the coupon controller device. It is further suggested that, on an infrequent-but-regular basis, the data regarding new customers, or the purchasing or other history as to current customers, be batched and sent via a communication link to a central host system. Similarly, as rules or promotions change, they may be downloaded to all of the various store locations from the host. It is recognized, however, that it is not feasible to download information sent back to the host regarding a particular consumer at store A to stores B, C, D, etc., as the volume of information would be unmanageable. In addition, even if a customer's information from one store was linked to the other stores, it would only be available once a day or less often—after accomplishment of the upload/download with the host system. Thus, if a particular consumer visited store A in the morning and store B later that day, there would be no record at store B of the earlier purchase, rental, or other transaction.

Stein is directed primarily to the video rental business where, as the patent acknowledges, it is unusual for an individual user to use the system more than once a day. In such a case, the once-a-day polling of the in-store computer to transfer information to the host is seen as sufficient. Such would not be the case in many other businesses. It would also be impractical in coordinated marketing efforts where, for example, a purchase of food items by consumers of a specified age range during a specific time of day might precipitate the printing of a coupon for a discount on the rental of a videotape. If, however, the consumer had already rented the video, the discount coupon could be received with antagonism—an undesirable result. If the system were smart enough to know that the consumer had already rented the video, it could, for example, print out a discount coupon for a car wash or something else. Thus, it is evident that a system is needed that can provide personalized promotions and information to a consumer based on his or her up-to-the-minute purchasing history regardless of which stores or store locations he or she visits.

Another drawback of systems such as that disclosed in Stein et al. is its expense and its inability to adapt to a widely-varying set of business environments. Because the Stein system is dependent on a POS system, kiosks, and/or coupon controllers, the equipment expense may be prohibitive for many businesses. Further, even where a business already has a POS in place, there are many different interfaces and formats used in the wide variety of POS systems currently available on the market. Thus, the software, hardware, and other required components of the Stein system would have to be available in a multitude of formats to be adaptable to every site. In the alternative, the Stein system could be customized as an order for the system was received. Either way, however, offering a system that must be customized for each specific application would drive the costs too high to make it practical for a wide variety of uses. Thus, it would be advantageous to have a system that offers the advantages of personalized promotion and communication across the spectrum of POS systems without requiring expensive equipment for effective operation.

Equipment costs and the inability to service a user at multiple locations also affects the ability of a system such as the one disclosed in Stein to share the information gathering and targeted communication capabilities among multiple businesses or organizations. For instance, a restaurant which typically caters to small children may wish to install a system for a frequent-shopper program at multiple locations. It would be desirable if another business, like an amusement park, could co-sponsor such a promotion where, for example, a reduced-admission ticket to the park is offered upon a predetermined number of visits to the restaurant or after reaching a dollar value purchase threshold. As previously discussed, the Stein system does not provide an effective method for keeping track of a customer's current purchasing history at each store location. Uploading and downloading the information on every customer to each store would, at best, be slow and would require extensive memory capabilities at each location. Where the business wishing to use such a system was national or international with tens of thousands of locations and hundreds of thousands or even millions of customers, it is easy to see that such shared offerings would not be feasible. Thus, the shared promotional effort would, in effect, be confined to one or, at most a few, store locations, greatly diminishing its desirability. Shared promotional offerings would also require enhanced data processing capabilities to make more sophisticated determinations based on a greater number of parameters. Under the Stein system, this would again require expensive equipment at each system location. Thus, a system is needed that can be used in multiple locations with information regarding the user current at all times without the need for expensive equipment investments and constant polling, uploading, and downloading of data.

U.S. Pat. No. 5,380,991 to Valencia et al. discloses use of an integrated circuit ("IC") or "smart card" for a paperless coupon redemption system wherein a consumer purchases or is given a card with on-board intelligence. That consumer then selects coupons for products of interest to him/her, and these "picks" are then stored on the card. The consumer carries the card into a business of his/her choice where coupon amounts recorded on the card are automatically deducted from the total bill at check-out with update of the card information to show that a particular coupon has been redeemed. This system is somewhat personalized in that it permits the customer to take advantage of selected and, therefore, targeted coupons at the store of his/her choice. Further, because the customer's coupon picks are on a card which they carry, they are available for use at any time and at any system location. In addition, multiple businesses may take advantage of the system by offering their coupons for selection. While Valencia provides a good solution to targeted coupon distribution, it does not go further to provide personal interaction with the consumer at the place of business where he/she has chosen to shop. There is no personalization which would entice repeated visits, no opportunity to run frequent shopper programs or other such contests or events, and nothing to encourage a customer to try a new product or place of business. This is a static product.

Other types of user card systems have been employed to achieve a targeted system of promotion and/or communication with a particular user. In Kakinuma et al., for example, a portable magnetic card reading and writing apparatus is disclosed. The user card or data record card in Kakinuma consists of a card such as those used for credit cards provided with heat-sensitive paper at one portion of the card and a magnetic tape—at another segment of the card. The magnetic tape is similar to that on a typical credit card and may be used for recording, reading, and rerecording of machine readable/writeable data. The heat-sensitive paper serves to accommodate a visual display of the information recorded in the magnetic strip. In this manner, visual feedback is offered to the user rather than the mere machine-readable update of the information on the card as proposed in Valencia.

The visual output to the card in Kakinuma, however, is merely a direct display of the user-supplied information. A user inputs data through use of a key pad or other such entry device, and the information so inputted is then written into the magnetic stripe in machine-readable format and onto the heat-sensitive paper in human-readable format. Because the Kakinuma system is principally drawn to use as a check issuing card, it is sufficient for that application that the information written in human readable form on the heat sensitive tape is confined to the information or data input via a keyboard by the user. For instance, a user may input a check amount and a date of issuance and this data is then entered in visual and magnetic form upon the card. There is no teaching in Kakinuma to provide sufficient storage and data processing capabilities within the printer/reader/writer apparatus so that intelligent responses, such as those required for use in a personalized frequent shopper or customer loyalty program, may be determined from the data entered by the user in correlation with data stored within the unit. To have a system which is effectively personalized and targeted in its responses to the user, it is necessary to provide more than mere feedback to the user of the information the user has supplied.

While the immediate visual display of information to the user can be a positive feature in achieving the desired personalization of communication with a user, the heat-sensitive template disclosed in Kakinuma has its weaknesses. First, while it is not expressly disclosed in Kakinuma, heat-sensitive paper is short-lived in its ability to store information. Fading and/or bleaching makes the printed information difficult to read over time. Also, as with any paper product, introduction of moisture or humidity is destructive. Second, heat-sensitive paper can be used only once. It cannot be erased and rewritten upon. Thus, the card disclosed in Kakinuma makes a permanent visual record that does not accommodate the repeated updates necessary to provide a user with a continuously-current personalized response. Third, heat-sensitive paper is rudimentary in its display capabilities, not allowing for high-quality graphics or other sophisticated responses to a user. Further, there is no indication in Kakinuma that there is sufficient memory and processing capability within the card reading/writing apparatus disclosed to accomplish more than the mere reiteration of the user-supplied information into the visual display. Sufficient memory and processing capabilities, as well as a more effectual display means, are required to accommodate sophisticated promotional communications such as rewards for frequent shopping, contests, games, sweepstakes, or shared marketing programs in which various company trademarks could be displayed.

Star Micronics® has offered what it calls a "Visual Card" with related reader/writer apparatus. As in Kakinuma, the Visual Card is a card employing a magnetic strip for recording and re-recording of machine-readable information in combination with a visual print region. Unlike the heat-sensitive paper in Kakinuma, human readable text in the Visual Card System is laid down by means of magnetic particles which are aligned by a recording head to produce characters. Thus, the Visual Card System has an advantage over Kakinuma in that the visual text may be erased and rewritten. There are problems with this method of visual display as well, however, in that the print field on the Visual Card is quite limited in area, being offered as only a three-line print region. Further, any introduction of a magnetic field will tend to cancel or disrupt the visual image, making it highly unstable. In addition, the Visual Card System offers no keyboard or other direct data input means apart from connection to an external device such as a computer. Moreover, the apparatus of the Visual Card System does not include on-board memory and processing capabilities to provide sophisticated visual responses to the user based solely on the information stored on the card, and in the apparatus itself, without the need to link to an expensive external device. Thus, although the Visual Card carries data on the card itself and, therefore, has the potential of bringing current user purchasing information with it to each site location, the Visual Card System still requires expensive additional equipment such as a computer or POS system to input data and to make the intelligent data determinations required to provide highlypersonalized and sophisticated responses on a user's card. And again, even where such additional equipment is available, the Visual Card System has an unstable and confined method of displaying a response to a user in a limited area of the card.

In desiring to provide a personalized consumer response that draws that consumer's attention and focus, it would be useful to offer a system in which a response may be provided to a consumer beyond a simple visual display on the user card. Thus, a system is needed that offers users a highly-personalized and sophisticated response on the user card. In addition, it is desirable to have a system that can offer users additional responses beyond those on their user card such as sounds, lights, music, printed coupons, gift certificates, co-sponsored awards, or the like. In addition, it is desirable to provide such a system without the need for expensive additional equipment.

Accordingly, it is a primary object of the present invention to provide a system that, upon request, provides a personalized message, individually targeted promotion, or other such individually fashioned response to a user based on that user's demographic characteristics, current purchasing or other activities, personal purchasing history, and other external factors such as the date or time, with each of these elements being evaluated and processed through multiple decision trees.

A further object is to provide a system which is capable of storing and processing sufficient data to provide the user with sophisticated responses without the need for external storage, processing equipment, or data input means.

Still another object is to provide an economical system wherein a user may go to any location using the system at any time and receive a personalized response in real time based on up-to-the-minute information regarding that user.

It is a further object of the present invention to provide a marketing system which will provide a customer a feeling of individual significance.

It is a still further object to provide a system which is adaptable to any location regardless of the POS or operating system in place at that location.

Still another object is a system which encourages co-sponsored promotions by facilitating delivery of personalized and targeted promotions, coupons, or the like by more than one business or other such entity at all system locations without the need for expensive equipment, data translation, or interconnection.

It is another object to offer a system which provides the user with a stable and high-quality visual display on their user card.

A further object is to provide a system which delivers a visual, audible, or other such response to a user in addition to a printed message, coupon, or other such response.

SUMMARY OF THE INVENTION

The present invention relates to an affordable, yet effective, system, method, and related apparatus for determining, upon request, an appropriate personalized and individually-targeted response for a particular user based upon current user-specific data with real time delivery of that response to the user in non-volatile, erasable, re-writable visual format without the need to retrieve data from an outside source.

The invention comprises a transportable user card or record, which need not contain on-board processing capacity, and a printer/reader/writer ("PRW") apparatus. In one embodiment, the user card comprises a magnetic surface for writing, storing and re-writing machine-readable data and a thermo-reversible print region for receiving and visually displaying a determined response to a user in non-volatile, erasable, re-writable graphical or textual human-readable format. The PRW apparatus of this embodiment comprises magnetic read/write capabilities, thermo-chromic write/erase means, data entry and display means, and sufficient data storage and processing means. It is significant to note that while this summary focuses on this embodiment, other means for storage and retrieval of machine-readable data and for erasable/re-writeable visual display on the user card may be used without departing from the scope of the present invention.

The user card or record is equipped both with a magnetic surface for receiving and storing data in machine-readable format and with a separate area covered in a thermo-reversible or thermo-chromic type film for receiving, obliterating, and subsequent reception of modified or entirely different data in a human-readable format. The thermo-chromic and magnetic film region on the card may be in any size or shape and may, if desired, cover the entire card surface. As graphics and coloration may be placed on top of the magnetic surface without affecting its ability to store retrievable data, covering the entire card with magnetic film will not affect the aesthetic appeal of the card. Where the magnetic surface covers one entire side of the card, the card may be inserted into the PRW in either direction with information relating to separate programs being encoded on opposite sides of the card. Graphics may be placed on the associated ends of the card to direct the user as to which end to insert first to access a given program, creating an attractive card with multiple uses or co-sponsored programs. Further, although, at present, typical magnetic read/write heads accommodate only three lines of information, covering the entire side of the card with the magnetic surface facilitates larger read/write heads and, therefore, storage of more encoded information. In addition, the user record may be crafted in any chosen size or shape and of any material suitable for placement of the magnetic and thermo-chromic applications. For ease of carrying and to accommodate familiarity and comfort with the user, it is preferable to make the user record from a plastic and in the shape and size of a typical credit card.

The PRW of the present invention is designed to manage multiple applications previously handled by separate devices and to facilitate the interface of data stored within the PRW with data contained on the user card without the need for communication with an outside source. This has been achieved by including in one unit magnetic read/write capabilities, sufficient short- and long-term data storage capability, intelligent control and decision-making logic and intelligence, means for data entry, display means, customized data processing means, and means for thermo-chromic print, erasure, and reprint of text in human-readable format and graphics.

The PRW is equipped with an entry slot or other such opening capable of receiving the user card or record. Disposed along the path of the user card within the PRW and aligned to coincide with the magnetic portion of the card are means for reading machine readable code from said magnetic portion of the user card. Data read from said magnetic portion may then be stored in data processing retrievable format in memory storage means within the PRW. Upon reading and storing the data from the card, the customized processing means may prompt the user through the display means for entry of data relevant to the current transaction. Such data may then be entered by means of a keypad or other such entry means positioned in an easily-accessible manner along the outer casing of the PRW. In the alternative, data entry relevant to the current transaction may be automatically entered into the PRW by means of connection via an input/output ("I/O") port to an external device such as a POS system or computer.

Upon receipt of data read from the card and entry of data relevant to the current user transaction, the customized processing means interfaces this information with program data stored in data processing retrievable format in the PRW's storage means. Through this interface, determinations are made as to an appropriate and personalized response for said user. Such response is then printed by the thermo-chromic print means to the thermo-chromic region of the user card. In one embodiment, in addition to the visual printout of a personalized response onto the user card, the processing means may also trigger a printer means which is capable of printing to hard copy. Such printer means may either be resident within the PRW or an external device interfaced with the PRW through an I/O port. Production of a hard copy printout facilitates production of items such as coupons, admission tickets, gift certificates, or merely messages or information in addition to that which is printed on the card itself. Printout of hard copy also plays an important role in the ability of the system to link promotions or other services of one business with those of another business or organization. For example, business A installs the system and uses it to promote repeat business through a frequent shopper program. As a reward for a specified number of visits, the system provides a coupon, gift certificate or other such reward for use at business B.

In addition to directing printouts of visual data to the thermo-chromic region of the card and to any hard copy printer means if so desired, the processing means also writes information relevant to the user's current transaction into the magnetic region of the user's card, rewriting and, thereby, updating the information previously stored there. The processing means also transfers data read from the card which identifies the user along with data relating to the current transaction into a storage means within the PRW, where it is saved in data processing retrievable format for later transport to a central database. Because the information on a user's card is kept current at all times, the user may go immediately from one system site to another with the system at all locations being capable of responding based on up-to-the-minute user information. There is no delay in responding to a user's most recent transactions while waiting for the system to batch the current data, upload it to a central site, and download it again to other sites within the system.

Although communication with an external source is not required to complete an interaction with a user, a means of communication may be desirable to further enhance the system of the present invention. According to one embodiment, a communication means is provided such that the system may transfer and/or receive data such as a user's personal or purchasing history, promotional offers, or updates to software resident in the PRW. Such a communication means may be provided either by connection through a parallel/serial port to an external communication device such as a modem or by means of integration of such a device within the PRW itself.

It should be appreciated that while this summary and the description which follows focus on use of the system of the present invention in the field of marketing applications such as frequent shopper programs, contests and the like; the system is equally adaptable to many alternative fields. For example, and not by way of limitation, the system could be used for: time and attendance record keeping with feedback and encouragement (perhaps rewards) to employees displayed on the card; gift certificates; debit cards; hotel keys, airline boarding passes with display of flight information and frequent-flyer awards, prepaid telephone cards with a displayed record of calls; video rental with frequent rental reward; library checkout with visual record to patron of return dates, or remote ticketing.

In addition, the PRW and the user card disclosed herein is designed to accept and read magnetic stripes as are found on debit or credit cards. Thus, where a communication device or other link to records is provided, the PRW may also serve as an independent credit verification system or debit card system. Accordingly, the system of the current invention may fulfill many different roles: a credit card with display of available credit on the card; or reward of a coupon after a dollar amount has been spent; display of flight information for an airline ticket purchased with the credit card information encoded on the card; and so on.

It should further be appreciated that while use of a magnetic stripe and thermo-chromic film are taught herein as the means of placing machine- and human-readable data on the user card, the system disclosed herein is not dependent on these specific embodiments. Other methods of storing machine-readable data or displaying human-readable data upon request on a user card may be known or become known which would come within the scope of the present invention. For example, one important alternative for storage of machine-readable data is use of an integrated circuit or IC card. The capacity of such a card to carry substantial user information is well known. The IC cards to date, however, do not have the capacity for a visual display to the user. Use of an IC card that includes a thermo-chromic print region would provide a unique dimension to the present invention. Such a card could either do away with the magnetic stripe or the stripe could be retained as an additional data source. The PRW would require only minor modification to accommodate interface with the IC portion of the card. The memory and processing capabilities of the PRW of the system disclosed herein allow for application software at the point where the card meets the reading terminal, as opposed to the dumb readers typically used to read IC cards. By integrating the functions of the system of the present invention with the typical uses for an IC card, a multi-function card could be offered to a user where one card could act as a credit card; debit card; frequency record and reward card; time and attendance card; and so forth, with visual display to the user. Similarly, other methods may become known which would provide the stable, high quality, yet erasable human readable display taught in this invention. Thus, it should be appreciated that other means of transportable storage of data in combination with a stable, high-quality print surface may be used within the scope of the present invention.

BRIEF DESCRIPTION OF THE DRAWINGS

FIG. 1A is a front perspective view of a user card or record according to one embodiment of the present invention.

FIG. 1B is a back perspective view of a user card or record according to one embodiment of the present invention.

FIG. 2A is a front perspective view of a printer/reader/writer device according to one embodiment of the present invention.

FIG. 3C is an enlarged view of a user card as shown in FIG. 1 demonstrating use of the card and a printed hard copy coupon for shared marketing promotions.

FIG. 4 is a flow-diagram of present claimed invention for conducting transactions at multiple and diverse locations.

DESCRIPTION OF THE PRESENTLY PREFERRED EMBODIMENT

Figure 2B:
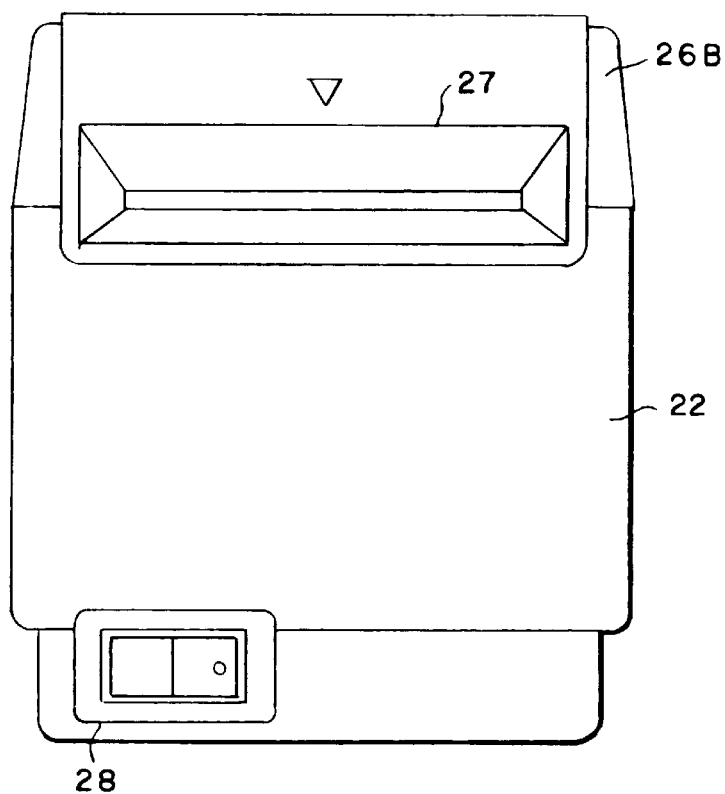
FIG. 2B is a front elevational view of the printer/reader/writer of FIG. 2A.
Figure 2C:
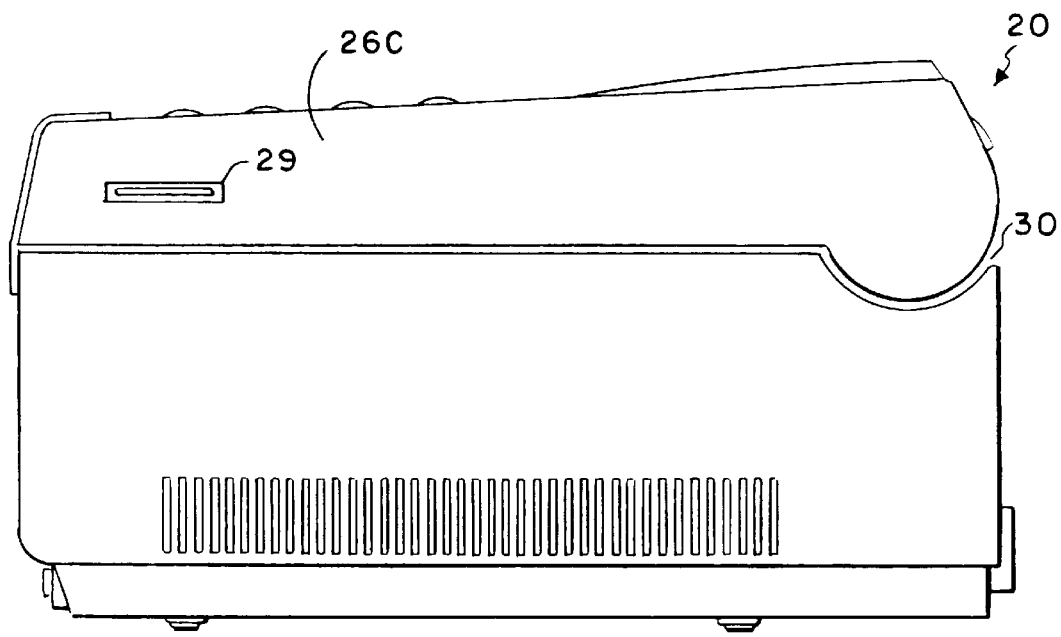
FIG. 2C is a right elevational view of the printer/reader/writer of FIG. 2A.

Reference is now made to the figures wherein like parts are referred to by like numerals throughout. Referring to FIGS. 1 and 2, a user card or record is shown generally at 10 and a perspective view of the general structure of a PRW device is shown generally at 20. Both are illustrated in accordance with one embodiment of the present invention. With particular reference to FIGS. 1A and 1B, the user card 10 is of the same size and composition as that generally used for a typical credit or debit card, being rectangular in shape with a top edge 11, a bottom edge 12, a left edge 13, a right edge 14, a front 15, and a back 16.

Disposed on the front 15 of the card 10 is a rectangular area covering approximately one-half of the card which represents the thermo-chromic write/erase region 17. While this embodiment teaches a defined area, the thermo-chromic film may be disposed across as much of the card as desired, defining a larger or smaller visual print region. The principles employed in the thermo-chromic or thermo-reversible print properties used herein are described in U.S. Pat. No. 5,188,815 to Coates et al.; U.S. Pat. No. 5,130,049 to Sage et al.; and U.S. Pat. No. 3,891,607 to Kuhn et al., among others. Other than the thermo-chromic print region 17, the front of the card may be colored in any chosen variation and imprinted with names, logos, or any other chosen designator, as illustrated in FIG. 1A. A magnetic surface 18 is placed on the back side of the card 16 (FIG. 1B) for the encoding of information. To provide sufficient storage capacity, it is preferable that the magnetic portion 18 accommodate at least three separate lines of data. In a preferred embodiment, magnetic film print region 18 covers the entire back side of the card. It is therefore possible to encode information for separate applications running along left edge 13 and right edge 14. Coloration and graphics may be placed over the entire magnetic surface area. If desired, coloration of an elongated rectangular stripe 18a running along the left edge 13 or right edge 14 may be added to assist the user in proper placement of the card into the PRW. To manufacture such a card, sheets and/or rolls or thermo-chromic film material are presently available from Ricoh Electronics, Inc. in Santa Ana, Calif. Magnetic film is also generally available. These films are then printed, applied to card stock, and cut to the desired dimensions.

FIG. 2A presents a front perspective view of a representative example of a PRW device according to the current invention, designated generally at 20. The device is contained in an outer casing or housing 21 which has front panel 22; right panel 23; left panel 24 (not shown); back panel 25 (not shown); and cover 26 comprising top panel 26A, front lip 26B, right lip 26C, left lip (not shown), and back lip (not shown). Referring now to FIGS. 2B through 2E, a transverse slot or opening 27 is provided at the intersection of front panel 22 and front lip 26B of cover 26 (FIG. 2B) for entry of a user card or record 10 (FIG. 1). An on/off power switch 28 is placed in a convenient location on front panel 22 (FIG. 2B). A cover latch 29 is provided in right lip 26C of cover 26 (see FIG. 2C) to facilitate lifting of hinged cover 26 about hinge 30 to provide access to the mechanics within PRW 20. Top panel 26A of cover 26 is provided with a sixteen-key touchpad 31 and a multi-line liquid-crystal display ("LCD") 32 (see FIG. 2D). LCD 32 can be selectively used to provide a display of selected information that prompts the user to select from various programmed options.

Encased in PRW 20 are magnetic read/write means (not shown) that are situated to align the read and write heads with a selected portion of magnetic film print region 18 on card 10 as card 10 is inserted in slot 27. PRW 20 further contains thermo-chromic write/erase means (not shown) that are aligned for erasing and printing to the thermo-chromic region 17 on front 15 of card 10. Such magnetic read/write and thermo-chromic write/erase means are known in the art and are commercially available.

Figure 2E:
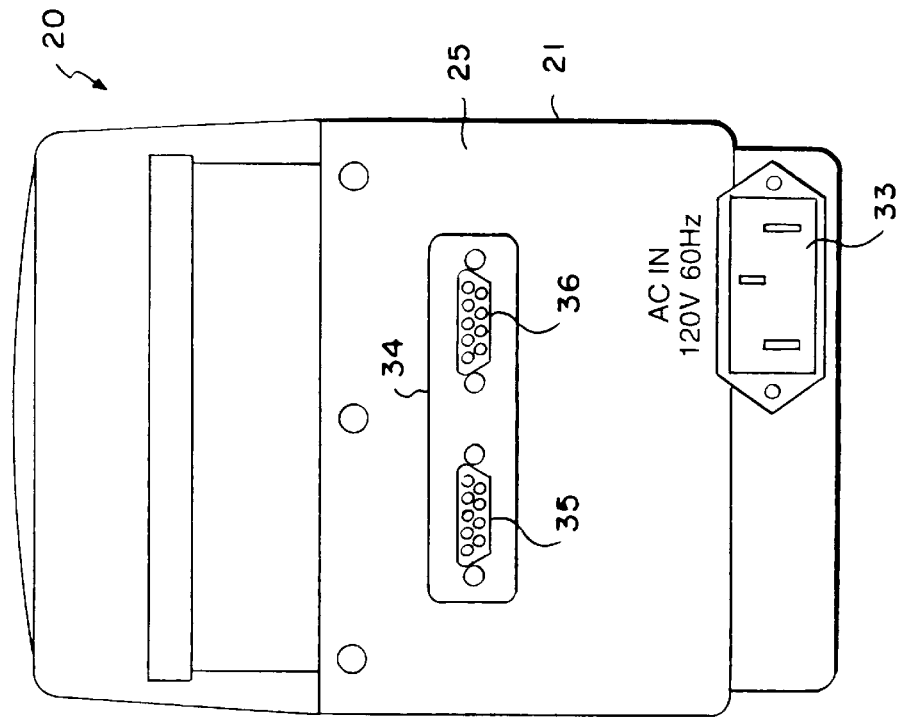
FIG. 2E is a rear elevational view of the printer/reader/writer of FIG. 2A.

FIG. 2E presents a rear elevational view of back panel 25 of the outer casing 21 which includes a power supply 33 and one or more input/output connectors ("I/O") 34. One such connector 35 is adapted to receive a multi-wire cable connected to a POS system or some other external data storage or processing device (not shown). Other connectors 36 (only one shown) are adapted to receive a multi-wire cable connected to peripheral devices (not shown) such as a modem, an external printer, or an external device for producing an audible or visual signal device to a user such as flashing fights, music, bells, or whistles. It is important to note that connection to a POS system or other data storage or processing unit, as well as connection to external peripherals, is not necessary to accomplish interaction with a user under the system of the present invention. Thus, I/O connectors 34 are provided merely as a means of offering additional dimension to the basic system.

For example, a POS system is not necessary in that PRW device 20 itself contains sufficient data memory and processing means to make intelligent decisions regarding sophisticated personalized responses based on current user data. Where a POS system is available, however, it can serve as additional storage and/or processing means and can automatically feed transaction information to PRW 20, if desired. Thus, PRW 20 is adapted via connector 35 with a means for linking to such a POS system.

Similarly, although external peripherals are not necessary for the system of the invention to interact with a user, addition of some peripherals may add a desirable dimension to the system's ability to communicate with the user. For instance, connection to a modem or other such communication device is not required to accomplish interaction with a particular user. It is beneficial, however, to have a communication link with a central host computer. A host can provide a central storage area for information regarding all users within the system. Data regarding new users and the purchasing history or other such updates relating to current users may be batched and uploaded to the central host daily or as desired. There is no urgency, however, other than to free up memory space at PRW 20 (FIG. 2), in that the current data required to interact with each user is carried directly on user card 10 (FIG. 1). A central storage of user data is beneficial for designing future promotions and co-sponsored promotions as well as serving as a backup source in the event that a user should misplace his or her user card. Information regarding current promotions, contests, sweepstakes, new products and the like may be automatically downloaded from a central host to each system site through such a communication link as well. In addition, updates to the customized software resident in PRW 20 may also be sent via a communication link to a central host. Finally, if desired, a communication link allows the system to act as a typical credit or debit facility. Magnetic film print region 18 on user card 10 (FIG. 1) carries information identifying the user as on any credit or debit card. Thus, credit/debit verification can be provided through a simple query to a central credit verification source, as is done in any typical credit/debit card transaction, allowing PRW 20 (FIG. 2) to serve as a typical Verifone®.

Connection to other peripherals, although not required, may also be desirable. An external printer (not shown) provides the ability to print to hard copy such as a coupon in addition to the thermo-print onto user card 10. Such a device is particularly useful in facilitating co-sponsored promotions. Knowledge regarding the personal and purchasing history of a user accumulated through use of the system of the present invention may be used to design highly-targeted co-sponsored promotions with other businesses. Connection to an external printer may then be desirable as a means of printing targeted coupons or offers that may be used at these other businesses. Use of a thermal-type printer is desirable because it would permit printing of trademarks and graphics relating to several other businesses, all of which could be stored in the long-term memory and the processing means (not shown) resident within PRW 20 (FIG. 2). In another embodiment of the present invention, a printer and modem could be integrated within PRW 20.

Of particular significance is the data storage and processing means (not shown) resident in PRW 20. PRW 20 is endowed with sufficient long- and short-term data storage and data processing means to facilitate intelligent decisions and direct highly targeted responses to the user. It has been determined, at present, that at least four megabits ROM and four megabits RAM provide a desirable result, however, it should be appreciated that this is not a fixed parameter.

Customized software is provided to achieve the particularized result desirable under the promotional or other program being offered by the system. Software is necessary for several different functions. Operating system software directs operation functions such as magnetic and thermo-chromic read, write, erase, and/or print functions; temporary and long-term storage of user data read, data entry on keypad 31 (FIG. 2D); display on LCD 32 (FIG. 2D); storage and control of printout fonts; and interaction with external devices such as modems, printers, POS systems, or award alarm or signaling devices (not shown). Specialized application software is designed according to the particular program offered by the system to determine appropriate user responses. In determining appropriate user responses, the specialized application software correlates a user's personal and purchasing history as read from magnetic film print region 18 on user card 10 (FIG. 1); program data such as available promotions or awards, threshold values, prizes, limits, thresholds, rules, and messages which are stored in memory means in PRW 20; and information regarding the user's current transaction as input by means of keypad 31 or a POS system linked by connector 35. Determinations are made based on a series of rules and queries which direct the specialized application software to consider specific information regarding the user such as birth date, demographics, purchasing history, or other relevant user information to fashion a personalized response in the form of a visual message printed to the thermo-chromic region 17 on user card 10 (FIG. 1); a printed coupon; and/or a celebrating award symbol such as bells, whistles, flashing lights, or a chorus of happy birthday, to name only a few possibilities.

Finally, data acquisition software directs storage in memory means in PRW 20 of information relating to new users and information regarding the current purchases and awards of established users for upload to the central host at a later time. Daily upload is recommended in that it frees up the memory space within PRW 20. The application software also updates the data contained in the magnetic portion 18 of the user's card so that the user has with them up-to-the-minute information. This transportable storage enables the user to get an appropriate response from any system location at any time.

More specific details regarding the system of the present invention will be appreciated from a discussion of the system in interaction with a user. A typical interaction with a new and current user are described below with reference to the apparatus illustrated in FIGS. 1 and 2. Several approaches are possible in initiating a new user into the system. For instance, information from current marketing databases or other such sources may be used to create a user card carrying a particular user's personal and purchasing data. A unique user identification number is assigned to that user and encoded on the corresponding user card 10 and correlated with the file containing that user's data at a central host database. This user card 10 may then be sent to the user with an invitation for the user to join in the benefits of membership by bringing the card into a system site.

Another approach for initiating a new user is to provide an enrollment application (not shown) to a prospective user upon a first visit to a system location. This application may seek basic personal information such as name, address, birth date, marital status, number and ages of children, as well as questions directed at determining basic product preferences, needs, and desires. Upon handing in the enrollment application, a blank user card 10 is issued to that user. Upon entry of user card 10 into PRW 20 through slot 27, operating system software will direct the magnetic read/write means to read the user data encoded on the card's magnetic film print region 18. Once it is determined that there is no data on the card, the card will be recognized as new and the imbedded application software, in conjunction with the operating system software, will direct that the current date and the next available user identification number be encoded into magnetic film print region 18 and displayed on LCD screen 31. Personnel at the system location manually write the assigned user identification number onto the application form. Where a laser or other printer means is available, printing of appropriately-numbered applications could be automatically triggered, thereby eliminating the possibility of human error. The user card is now ready to be used by the system as a transportable storage medium by receiving information regarding that user's current transaction.

If it is desired that the user card 10 carry information about the user beyond the user identification number and current transaction information, additional information may be added to the card in a variety of ways. For example, at the user's first visit, specialized application software may prompt by means of LCD display 32 for the entry of data via keypad 31 which may be written upon the user card 10 by the magnetic write means within PRW 20. Alternatively, completed user enrollment application forms are sent to a central data input site where information from the application regarding that particular user is entered into a central database and referenced against that user's user identification number. Any information already stored at the central host regarding that user's purchasing history may be encoded, along with selected data from the application form, onto a replacement user card and mailed to the user. According to another approach, once information regarding a particular user has been entered into a central database, it may be downloaded for temporary storage to PRW's or other storage means at individual system sites. When that particular user comes to a site and enters his or her temporary card, the system will recognize the user number and transfer the stored user data to magnetic stripe 18 on user card 10.

Figure 2D:
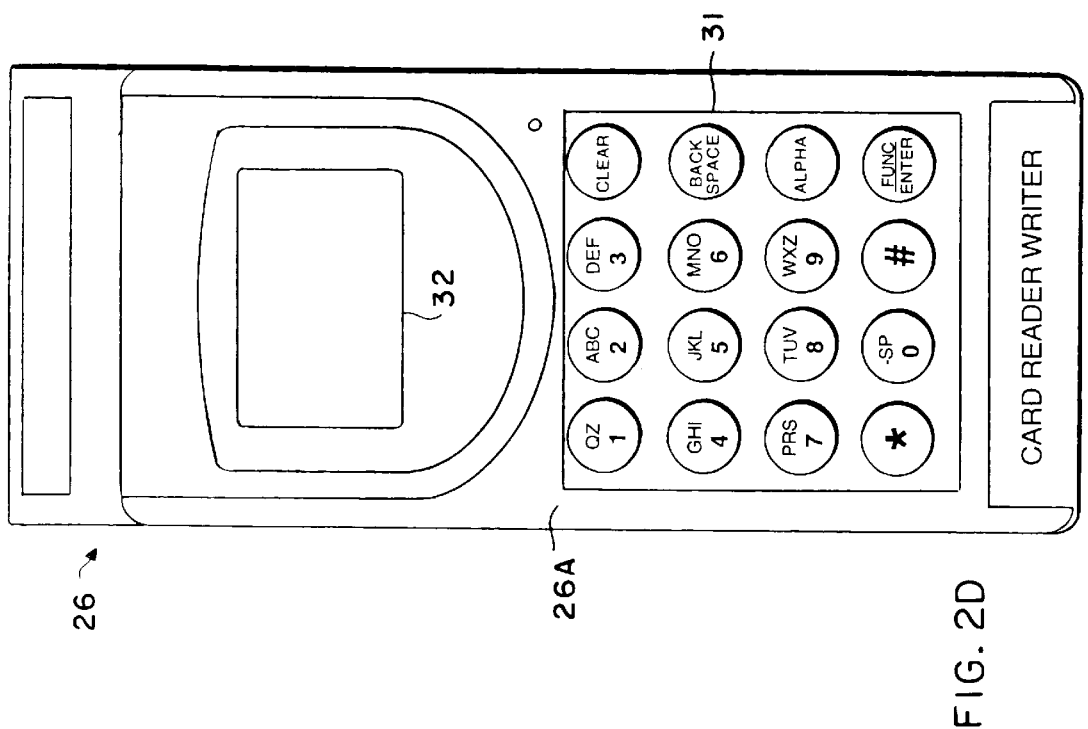
FIG. 2D is a top elevational view of the printer/reader/writer of FIG. 2A.

Nevertheless, the system operates the same regardless of the method by which a properly-encoded card reaches the hands of a user. By means of LCD 32, the operating system software prompts the entry of information regarding the user's current purchase or transaction which may be entered by means of keypad 31 or through a direct link with a POS system as previously described (FIG. 2D). Information so entered will be temporarily stored in short-term memory for use by the system in determining the appropriate targeted response to the user.

Figure 3B:
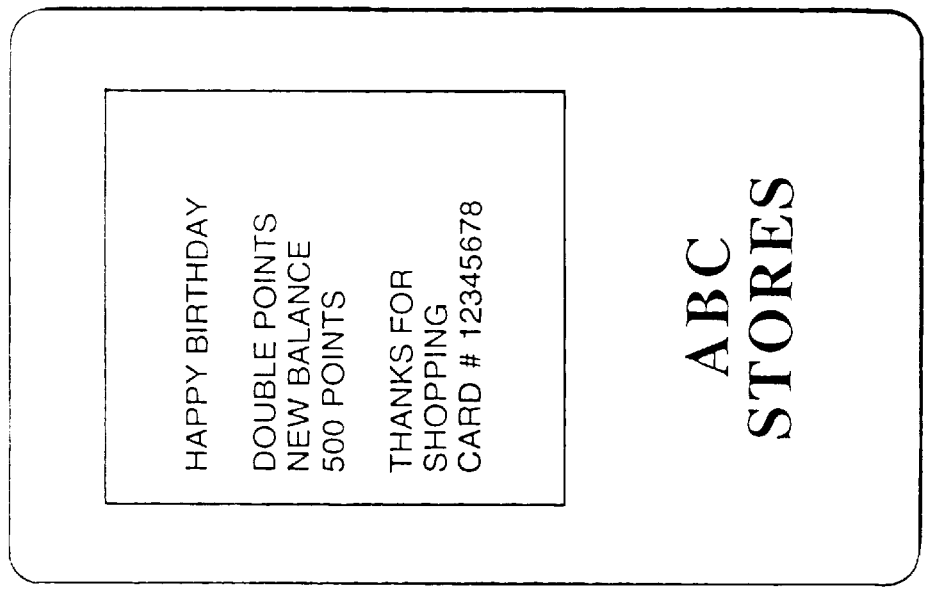
FIG. 3B is an enlarged view of a user card as shown in FIG. 1 demonstrating use of the card to reward a user's birthday.
Figure 3A:
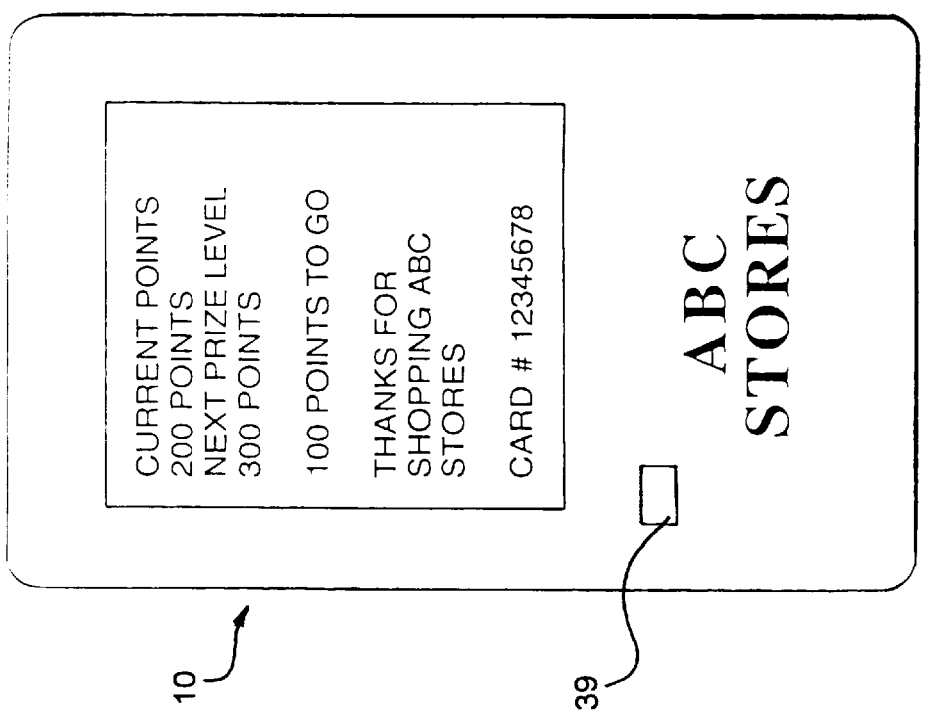
FIG. 3A is an enlarged view of a user card as shown in FIG. 1 demonstrating use of the card in a frequent-shopper program.

The specialized application software, stored in the PRW's long-term storage means, contains specific rules, tests, and parameters by which to judge user data and purchasing history to arrive at a personalized response. This specialized application software correlates and analyzes the user data now stored in short-term memory with current promotional offers available at that location stored in the PRW's long-term memory means. The application software is capable of making intelligent decisions taking into account the number of user visits, the products purchased at each visit, demographics regarding that particular customer, personal information such as birth dates, co-sponsored promotions which are appropriately targeted to that user, as well as specific information regarding that system location such as special promotions or product availability. As a result of this analysis, a highly-personalized and targeted response will be activated to the user. One response is in the form of a personalized message printed to region 17 on user card 10 by the thermo-chromic print means within PRW 20 (see FIGS. 3A, 3B, 3C as examples). There may also be direction given to an external printer to print a graphical display of a gift certificate, coupon, admission ticket or some other such promotion for the business at the system site or for use at another business (see FIG. 3C). In addition, a TTL signal may be sent via a cable connected to one of the I/O peripheral ports 34 as an activation signal to an external device capable of rewarding the user by way of flashing lights, buzzers, beepers, or even a musical composition.

The specialized application software in conjunction with the operating systems software will further direct that the magnetic writing means encode certain of the user data temporarily stored in the short-term storage means such as items purchased and the date onto magnetic stripe 18 of the user's card 10, thereby keeping the data contained on the user's card current. Further, some of the data stored in the short-term storage means may also be directed to be written into the long-term storage means for later transfer via a modem to a central host location.

Referring now to FIG. 4 inventive method and apparatus 100 permits a user in possession of transaction card 110 to conduct transactions at multiple and diverse locations 102, 103,104, 106, 107 within a short span of time and have present location 104 provided with the results of all previous transactions 102, 103 for card user 110 without the need for present location 104 to contact central processor or host unit 108 to exchange or update data related to consumer 110 or previous successive transactions 102, 103 (Arrows A, B). Method and apparatus 100 further provide card user 110 with an on-card, erasable, re-writable display of the updated status of the user's card information as well as presenting card user 110 with promotional program options which are specifically directed to particular user 110 based upon the transaction history of user card 110 as contained on user card 110.

This is accomplished, generally, by incorporating sufficient memory on user transaction card 110 to permit recording, reading and re-recording, for updating purposes, of the information carried on card 110. Since method and apparatus 100 also incorporates a machine readable security code on the card, the provision of a user-readable, erasable and re-writable message portion on card 110 and incorporation of point-of-sale printer-reader-writer units at locations 102, 103,104, 106, 107 permits complete interaction between user card 110 and system and apparatus 100 without the requirement that each of locations 102, 103,104, 106, 107 communicate with host 108 in order to accomplish a transaction have up-to-the-minute data for that consumer.

This feature of continuous information updating is of particular importance when it is desired to encourage the buying patterns of a consumer. The instant and continuous updating of card 110 information linked with the individual card display allows the consumer to be immediately apprised of their standing with respect to consumer program awards and purchase token awards without having to wait for their information to be downloaded to the particular location 104 where the consumer is transacting business. The provision for an on-card human readable display allows a message to be printed on card 110 which can inform the consumer of various special programs or discounts or the current total of the consumer's token account. This information can encourage the consumer to conduct particular additional business which will achieve the next award level identified on the card display.

Still referring to FIG. 4, each component comprising system, method and apparatus 100 will now be examined in greater detail beginning with host unit 108. Host unit 108 is the central controller for system 100. Through its communications hardware and software, host 108 can transmit programming to the processors of primary 102-4 and secondary 106-7 satellite units. Also, host 108 can receive consumer transaction data (Arrow G) collected by primary 102-4 and secondary 106-7 satellite units for updating individual user databases, updating program databases and expanding marketing databases and for executing program awards redemptions. The execution of awards program redemptions is accomplished, generally, by downloading card user 110 selections entered at secondary units 106-7. This is usually accomplished in a batch mode during off-hours or evening hours. During a batch transaction, the consumer redemption transactions related to card user 110 for the previous period are transmitted to host 108. Host 108 then integrates this information into its data bases for additional marketing reference. The particular redemption award selected by user 110 using secondary unit 106 (transaction arrow D) is then sent onto award distribution unit 112 for shipping (Arrow H) of the selected award to the card holder 110.

Host unit 108 also issues, monitors, and updates the token credit accounts of the local service agents who present either the primary 102-4 or secondary 106-7 terminal units for use by card users 110. The tokens or points or award units can be allocated to card users 110 during transactions A–D with card user 110. Alternatively, apparatus and program 100 can allow card user 110 to select between the token award or other award alternatives which the programing of host 108 has transmitted to primary 102-4 or secondary 106-7 units during the previous batch downloading session.

It will be appreciated that as the tokens or award units can have a cash value as between the issuing host terminal 108 and the primary and secondary terminals 102-4, 106-7 it is necessary for host terminal 108 to track the issuing and distribution of program tokens or award points so host unit 108 may issue billing statements to the holders of primary and secondary terminals 102-4, 106-7. Typically, a primary or secondary terminal 102-4, 106-7 would contain a minimum amount of pre-paid token credits in the terminal account. This account would at all times be sufficiently large that there would be no danger of the terminal 102-4, 106-7 being devoid of tokens during any business period the unit was in operation. In stocking a sufficient supply minimum, the terminal 102-4, 106-7 would be able to continue operations even when a download/upload (Arrows F, G) batch session with host terminal 108 had been missed during the last out-of-operation time period.

Another responsibility of host unit 108 is to update the promotional programming which is downloaded (Arrow F) into each of primary or secondary terminals 102-4, 106-7 in order to provide card user 110 with current information on promotions which are operating for that day. Host 108 also provides card user 110 with other transitory promotional information which has been programed for distribution (Arrow F) to primary and secondary terminals 102-4, 106-7 by the host unit 108. While system and apparatus 100 can provide an entire range of award programs one such example of such award program update is the notification of card users 110 that on a future date there will be a particular merchandise promotion at one of the primary terminal sites. It is important to appreciate that this notification can be written in human readable form on to user card 110 so the user will carry away a constant reminder of the future sale or merchandise promotion.

Another example of a promotional program might be a discount on merchandise purchased at a particular primary terminal 102-4 or offering card user 110 a bonus token or point award for purchases made at that particular primary terminal 102-4. Host unit 108 would distribute the new promotional update programming (Arrow F) during the off hours communication process and the information would be stored in the primary 102-4 and secondary terminals 106-7 for later exhibition on the human-readable section of the consumer transaction card 110. Card user 110 thereby would receive advance notice of special promotions scheduled to be available from a particular primary or secondary unit 102-4, 106-7 and in this manner the card holder 110 purchasing may be more accurately directed by the advertising and promotions.

Yet another type of promotional update which could be issued by host computer 108 would be the random award update. In this case host unit 108 modifies the programming of primary and secondary terminals 102-4, 106-7 so that, for example, during the next 30 days each fifteenth consumer to conduct a transaction at a terminal 102-4, 106-7, will receive a promotional award of some type, be it additional points, a free purchase, or some form of a discount on the purchase. To avoid disparate treatment of terminal 102-4, 106-7 owners the programming of the various random promotional awards can be compensated to the particular primary or secondary terminal 102-4, 106-7 owner. This is accomplished by host 108 providing compensating credits to the token account (Arrow F) for that particular or secondary terminal 102-4, 106-7.

In this manner, operational concerns of providing equal application to terminal owners of the random awards (cash awards, random awards of merchandise, random awards of additional tokens, random merchandise discounts, etc.) generated by host 108 programming can be avoided. In short, individual merchants owning the primary or secondary terminals 102-4, 106-7 need not be concerned that they alone are bearing the burden for the random or special awards executed at their particular terminal. Method and apparatus 100 provides the terminal owner with a compensating award of tokens in the terminal owner's token account equal to the value of the random promotion executed at the terminal owners location 102-4, 106-7.

Alternatively, outside vendors who wish to participate in the method, but who do not have a terminal 102-4, 106-7 or even a retail store, can engage the functions of the inventive method. This is accomplished through the use of the central host 108 programming to present random awards or business offers which are communicated to all terminals 102-4, 106-7 for display to all user cards 110. In this manner, a manufacturer of a product, a soft drink for example, can present a promotional offer to all card users 110 without actually providing its own terminal 102-4, 106-7 to the card user 110.

Additional functions of host unit 108 include downloading (Arrow G) the collected information from the primary and secondary units 102-4, 106-7 on a batch basis and to periodically contact the primary and secondary units in order to conduct that downloading of information. At the time of downloading information from the primary and secondary units, the previously described account transfers (Arrow F) can be conducted, shopper information can be collected and downloaded (Arrow G), data on awards programs selections can be downloaded for execution by the distribution center (Arrow G) and diagnostic programs can be operated on each of the primary and secondary terminals (Arrows F, G) in order to determine that they are properly functioning.

Turning now to primary terminal 102-4, its functions and operations will be described in detail. Generally, primary terminal 102-4 is a consumer transaction card interaction terminal which operates on information provided to terminal 102-4 on transaction card 110. It is not necessary for primary terminal 102-4 to interact with host unit 108 during normal operations. Since transaction card 110 provides all information needed by primary terminal 102-4 in order to effect program execution and to evaluate the particular consumer's qualifications for one of the program incentives.

When a consumer inserts transaction card 10 into primary unit 102-4, the primary unit will read the stored information on the card 110 which then provides terminal 102-4 with the completely current information regarding that prior and recent consumer's transactions (Arrows A & B). Since the embodiment of the invention described herein reads, updates, and re-records the critical consumer information on the consumer transported card, no interactions with any central database are required, and the consumer is carrying with them from terminal to terminal the most current information regarding their transactions and status with respect to the consumer's token account and their relationship to the various redemption programs offered.

The consumer inserts their transaction card into the machine where the status of their current account is read by the machine, and this account status is then evaluated with respect to the program. Such evaluation may take the form of comparing the consumer's token account with various program redemption levels in order to provide the consumer with an appropriate message regarding their next award, the number of consumer transactions with the system can be compared with the program to determine whether the number of transactions executed by that consumer qualifies the consumer for a response from the program or a particularized message to be written on the consumer's transaction card. In addition, the type of program for which the consumer has made an election to participate in, if any, can be determined and the terminal can then correlate that selection with the current possibilities offered by that particular program and the terminal can determine the next award level for which that consumer qualifies, or determine the proper number of points to be aware to that consumer, or simply determine if one of the program random awards applies to this consumer transaction.

As previously noted, the information contained on the card will inform the terminal whether or not this particular consumer has elected to participate in one type of program or a second type of program. By way of example, the first type of program may simply be the assignment of token points to the consumer based upon the dollar amount of the particular consumer transaction executed. Alternatively, the consumer may elect to participate in a program which allows the consumer to select between an award of token points, or a discount on the immediate consumer transaction. It will be appreciated that any number of alternatives may be developed for a consumer to select between, and the important feature of this aspect of the invention is that information is carried on the card which permits the terminal to recognize that the consumer has selected between one of several program options so that the terminal can apply the proper programming to the interaction with the consumer transaction card.

As has been previously presented, once the terminal has accessed the information carried on the consumer transaction card, the terminal can then make the appropriate determinations of how to interact with the particular consumer based upon the consumer's card-contained information, and the terminal can then execute the writing of an appropriate message in human readable form onto the display portion of the card. In the present embodiment, the display portion of the card is a thermochromic display affixed to the card.

While a separate display screen could be attached to the terminal in order to display messages to the consumer, it is important to appreciate that in areas of high commercial activity, it is preferred to avoid larger area display screens which will consume valuable counter space near the consumer transaction point, and also to avoid the creation of an additional means for delaying the consumer's departure from the point of retail transaction. It will be appreciated that the more information displayed to the consumer at the point of retail transaction, the longer it will take for the consumer to effect the transaction and to depart so that the next consumer transaction can occur. By eliminating the display function to the specific consumer transaction card, the card is ejected from the unit with the consumer message now entered thereon, and the consumer can depart the retail transaction area and examine the message written on the consumer transaction card by the terminal.

Referring now to the secondary transaction terminal, the features of this terminal will be described. The secondary transaction terminal is located, generally, at a fewer number of stores than is the primary transaction terminal. The secondary transactional terminal includes additional features and is intended to represent to the consumer the central point of focus for the inventive transaction system. In the secondary terminal, the consumer can interact with the program generated by the host terminal and can select personal consumer preferences for entry into the program and for storage onto the consumer transaction card, as well as affecting the redemption of transaction tokens in exchange for various program awards. It is important to note that the secondary terminal can affect all of the functions of the primary terminal but is provided with the additional interactive portions of programming. Therefore, it may be considered advantageous to have the secondary terminals located at a distance from a retail transaction area in order to avoid encumbering the locus of retail transactions. It is at the secondary terminal at which the consumer will be able to interact with a catalogue or list of token redemption awards and make the selection of the particular award that the consumer would wish to receive and to effect that transaction and communicate the selection of the award to the host terminal for distribution of the award to the consumer. In one embodiment of operation, the secondary terminals may be located at the tables of a restaurant which would allow the consumer to eat while interacting with the program and thereby have ample time to examine the various program award options presented by the secondary terminal and to make the appropriate selection. Alternatively, a secondary terminal need not be located at a particular retail location at all but may be located in the common area of a retail shopping mall, thereby providing the consumer with a comfortable and unhurried location for making token redemption decisions while associating the good will of the redemption transaction, generally, with the retail shopping mall.

Once the consumer has made the award program selection, the parameters of the selection are determined. The parameters of the selection usually consist of a determination of the award token or point total needed to achieve the award and a comparison of that number with the account on the consumer's card. If the consumer's card presents sufficient tokens to achieve the award, the transaction is completed and transmitted to the host unit at the conclusion of the business day. Once the information is transmitted to the host machine, it is communicated to the distribution center for actual transmittal of the award to the consumer.

Yet another alternative embodiment of system 100 (FIG. 4) involves the use of a user card 110 having a memory chip or computer processor chip 39 (FIG. 3A) mounted on card 110. Such cards are already in use and are denominated as 'smart cards' in the industry. The provision of such smart cards as user card 110 allows system 100 to incorporate features which the more limited magnetic strip cards 110 cannot offer. One such programming addition to system 100 through the use of a smart user card 110 is the ability to offer user 110 the opportunity to select between token awards to the token account of card 110 and a cash redeemable savings option. The savings options of the program allows the consumer to select receiving, where available, a credit to a savings-type account which the consumer can later exchange for an actual cash allocation.

The smart card embodiment also permits card 110 to be used as a 'cash purse' card. In this embodiment the user and load card 110 with a cash allocation account by selecting that option at secondary terminal 106-07 or by inserting card 110 in an automatic teller of a bank which is participating in system 100. In this manner the smart card 110 can be equipped with actual cash credit which can then be transferred to pay for a transaction. Alternatively, the smart card 110 can be equipped, at the user option, to additionally function as a credit card and which further offers the advantages of the system 100 attributes previously discussed to card user 110.

Although these descriptions have focused on use of the direct targeted delivery system of the present invention as a marketing tool and, more particularly, for a frequent shopper type of program, it should be appreciated that the system of the present invention is capable of being incorporated in the form of a variety of embodiments, only a few of which have been illustrated and described above. The invention may be embodied in other forms without departing from its spirit or essential characteristics. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

We claim:

1. An apparatus to obtain and track individual user consumer transaction data and to assign and redeem user transaction tokens comprising:
    a user portable transaction card said card comprising,
        a machine readable and writable memory on said card for recording thereon a user transaction token account,
        an erasable and rewritable user readable card message display,
    a first terminal for insertion of said transaction card therein, said first terminal comprising,
        a processor for directing terminal activities including a memory for loading , storing and directing a marketing program on the user transaction token account to obtain a result,
        a machine language printer/reader to permit reading machine readable data, and writing machine data onto card,
        a writer for creating and erasing a human readable message on said card message display,
    a second terminal for insertion of said transaction card therein, said second terminal comprising,
        a processor for directing terminal activities including a memory for loading, storing and directing a marketing program on the user transaction token account to obtain a result,
        a machine language printer/reader to permit reading machine readable data, and writing machine data onto card
        a writer for creating and erasing a human readable message on said card message display,
        a display unit for user examination and selection of token transaction exchanges from a token redemption database,
    a host terminal for directing the activities of said first and second terminals comprising,
        a processor for directing unit activities including a memory for loading, storing and directing a marketing program,
        a communications connection between said host and said first and second terminals to allow said host to exchange data with said first and second terminals including token transaction exchanges entered by said user at said second terminal,
        a communications connection between said host and a redemption distribution site to permit said host to direct the allocation of user selected token transaction exchanges to said users,
    such that said host communicates host program commands to said first and second terminals to provide allocation of transactions tokens and program awards to said user and said host can receive user transaction data from said first and second terminals and said user can select and direct messages to said host related to user redemption of transaction tokens.

2. The apparatus as claimed in claim 1 further comprising a cash account memory area on said user card allowing said card to operate as a debit card.

3. The apparatus as claimed in claim 1 further comprising a credit account memory area on said user card allowing said card to operate as a credit card.

4. The apparatus as claimed in claim 1 further comprising a pseudo first terminal at said host terminal said pseudo first terminal operating as a temporary processor of said first terminal activities to permit execution of said first terminal marketing program by an operator other than the first terminal operator.

5. The apparatus as claimed in claim 1 wherein said user card further comprises:

a plurality of read/write surfaces for receiving, writing, storing, and re-writing machine readable data;

said read/write surfaces being placed on at least one side of said user card;

said read/write surface being of sufficient size and placement that machine-readable code related to a first user purchasing history for a first promotional program is written along a first location on said card and second user purchasing history for a second promotional program is written along a second location on said card to allow said user card to be inserted into a terminal in more than one direction to activate either first or second promotional program.

* * * * *